May 12, 1931.  E. E. WEMP  1,804,905
CLUTCH FACING
Filed Jan. 31, 1929
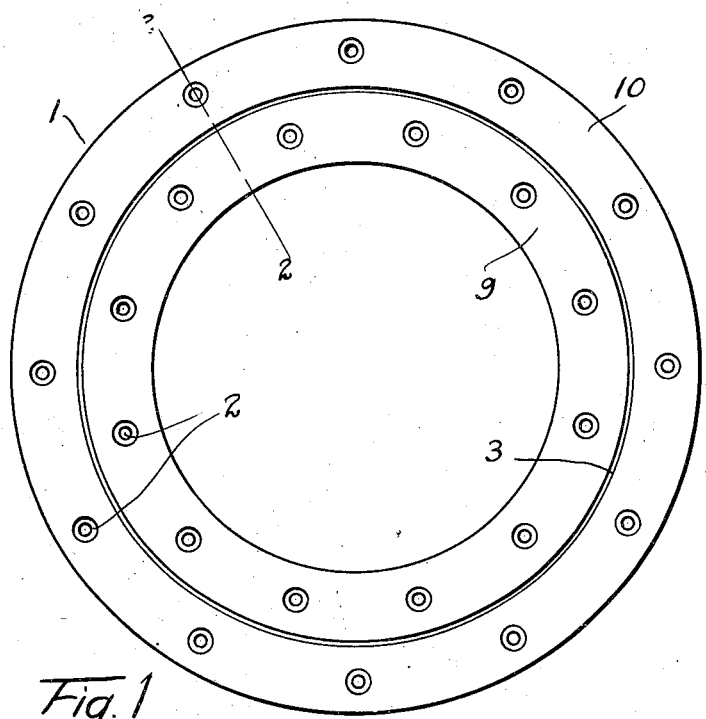
Fig. 1
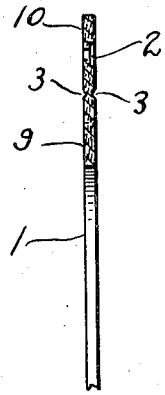
Fig. 2
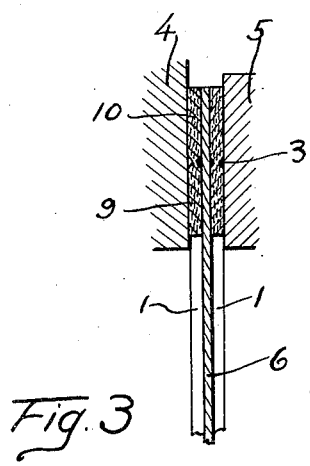
Fig. 3  Fig. 4
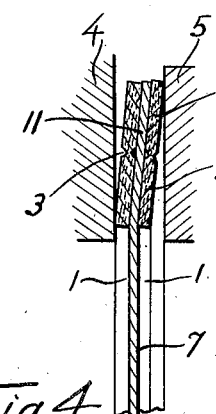
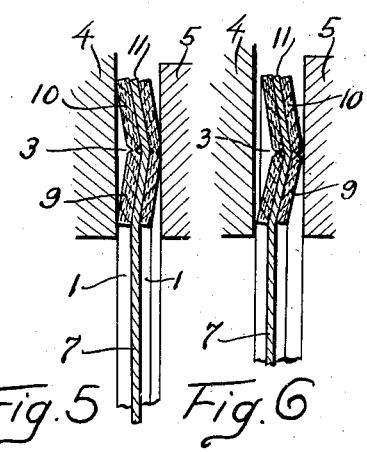
Fig. 5  Fig. 6
INVENTOR.
Ernest E. Wemp
BY
ATTORNEY.

Patented May 12, 1931

1,804,905

UNITED STATES PATENT OFFICE

ERNEST E. WEMP, OF DETROIT, MICHIGAN

CLUTCH FACING

Application filed January 31, 1929. Serial No. 336,347.

This invention relates to clutch facings.

In clutch discs of the type which are adapted to be distorted when the clutch is engaged, it is desirable to have a clutch disc facing which can be readily distorted to conform to the configuration of the distorted disc. Hence, it is the object of this invention to present a clutch disc facing which is scarfed whereby the disc facing is divided into a plurality of parts which are connected in hinged relation so that the disc facing is readily distortable with the above mentioned type of distortable clutch disc.

In the drawings:

Fig. 1 is an elevation of the scarfed facing.

Fig. 2 is a section along line 2—2 of Fig. 1.

Fig. 3 is a cross sectional view showing the facing mounted upon a flat clutch disc.

Fig. 4 is a view of the facing mounted upon a clutch disc of the type described in my Patent 1,571,747.

Figs. 5 and 6 are cross sectional views of the facing mounted upon a disc of the double truncated conical type described in my co-pending application, Serial No. 334,621, filed January 24, 1929. The distortion of the disc in Figs. 4 to 6 is exaggerated for descriptive clearness.

Referring more particularly to the drawings, the disc facing is designated 1 and has the holes 2 which are adapted to receive any suitable means such as rivets for securing the facing to the clutch disc. The facing is preferably continuous and scarfed concentrically as at 3.

In Figs. 3 to 6, the disc facing is shown mounted upon various types of clutch discs. In these figures, the flywheel, which constitutes in this instance the driving disc, may be designated 4, and the pressure plate 5.

In Fig. 3, the facing is mounted upon a flat disc 6 which is of the type that is fixed upon the driven shaft, and hence, must be distorted by the pressure plate 5 when the clutch is engaged. Owing to the scarfed portion 3 of the disc facing 1, the facing will readily conform to the distorted disc 6.

In Fig. 4, the facing 1 is shown mounted upon clutch disc 7 of the truncated conical type described in my Patent No. 1,571,747 which has an outer section 11 that is adapted to be distorted by pressure plate 5 when the clutch is let in. Owing to the concentrically scarfed area 3, the disc facing 1 is better adapted to adjust itself to the configuration of the distorted section 11 of the disc 7 when the clutch is engaged.

In Figs. 5 and 6, the facing is shown mounted upon the double truncated conical type of clutch disc which is described in my co-pending application, Serial No. 334,621, filed January 24, 1929. The facing 1, owing to the scarfed portion 3, permits a hinged action between the parts 9 and 10 of the facing.

As shown in Fig. 2 the facing is scarfed concentrically on both sides of the disc. This scarfed area 3 is of a smaller cross section than the rest of the disc facing. Hence, it is obvious that the disc facing will hinge about this scarfed area and that it may be more readily distorted to conform to the clutch disc when the clutch is engaged. Further, this hinged relation between the parts of the facing gives substantially all the benefits of a facing composed of a plurality of separate parts and the still further important benefit of obviating the necessity of handling a plurality of parts during the assembly of the facing to the clutch disc. Fig. 5 discloses a facing in which the parts 9 and 10 have a hinging action. After the facing has been used a while, it may break all of the way through as shown in Fig. 6, in which case the facing is divided into a plurality of separate parts.

It is evident from the above description that I have produced a clutch disc facing which will readily conform to the configuration of a distortable clutch disc and which may be efficiently assembled to the clutch disc.

What I claim is:

1. For a distortable clutch disc, a circumferentially scarfed facing.

2. For a distortable clutch disc, a concentrically scarfed facing.

3. For a distortable clutch disc, an initially scarfed facing arranged to readily conform to the configuration of the distortable disc.

4. For a disc-like distortable clutch disc, a facing having a plurality of hinged parts.

5. A facing for a clutch having opposed scarfs for a dividing said facing into a plurality of integral parts for facilitating the action of the disc in packing whereby the facing can be assembled to the clutch disc as a unit.

6. Facings for a clutch having opposed concentric scarfs which divide the facings into a plurality of integral concentric parts whereby the facings can be assembled to the clutch disc as a unit.

7. A facing for a clutch comprising a plurality of parts having an integral scarfed breakable connection whereby the parts may be initially assembled to the disc as a unit.

In testimony whereof I have affixed my signature.

ERNEST E. WEMP.